United States Patent
Lee et al.

(10) Patent No.: US 11,640,888 B2
(45) Date of Patent: May 2, 2023

(54) INPUT/OUTPUT DEVICE AND METHOD FOR CONTROLLING THE INPUT/OUTPUT DEVICE

(71) Applicant: HYUNDAI TRANSYS INCORPORATED, Seosan-si (KR)

(72) Inventors: Jin Woo Lee, Hwaseong-si (KR); Se Min Kim, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 17/726,876

(22) Filed: Apr. 22, 2022

(65) Prior Publication Data
US 2022/0344117 A1    Oct. 27, 2022

(30) Foreign Application Priority Data

Apr. 26, 2021 (KR) .................. 10-2021-0053708

(51) Int. Cl.
| | |
|---|---|
| *H01H 31/04* | (2006.01) |
| *H01H 47/00* | (2006.01) |
| *H04Q 9/00* | (2006.01) |
| *B60R 16/023* | (2006.01) |

(52) U.S. Cl.
CPC ............. *H01H 47/00* (2013.01); *H04Q 9/00* (2013.01); *B60R 16/0231* (2013.01); *H04Q 2209/30* (2013.01)

(58) Field of Classification Search
CPC ......... H01H 47/00; B60L 58/40; G05F 1/462; H01M 8/04567; H01M 8/04917; H02M 1/00
See application file for complete search history.

(56) References Cited

U.S. PATENT DOCUMENTS

| | | | |
|---|---|---|---|
| 6,452,402 B1* | 9/2002 | Kerai | H01R 24/86 324/537 |
| 2002/0063009 A1 | 5/2002 | Oyaski | |
| 2006/0258508 A1 | 11/2006 | Tanioka et al. | |
| 2014/0167712 A1* | 6/2014 | Kim | H01M 8/04917 323/234 |
| 2021/0237666 A1* | 8/2021 | Futa | G05D 1/0077 |

FOREIGN PATENT DOCUMENTS

| | | |
|---|---|---|
| KR | 20-1988-0003374 U | 4/1988 |
| KR | 20-1993-0020563 U | 9/1993 |
| KR | 101339279 B1 | 1/2014 |
| KR | 10-2082957 B1 | 3/2020 |

* cited by examiner

*Primary Examiner* — Jared Fureman
*Assistant Examiner* — Esayas G Yeshaw
(74) *Attorney, Agent, or Firm* — Novick, Kim & Lee; Jae Youn Kim (57) ABSTRACT

Proposed are an input/output device and a control method for the same, the device including a first input/output terminal that receives a forward signal from a limit switch or outputs power to a sensor; a second input/output terminal that receives a backward signal from the limit switch or receives a sensing signal from the sensor; and an integrated circuit unit that determines a communication target for exchanging a signal through the first input/output terminal and the second input/output terminal, and selectively receives or outputs the forward signal, the backward signal, the power of the sensor and the sensing signal based on the determination result.

7 Claims, 4 Drawing Sheets

INPUT/OUTPUT DEVICE AND METHOD FOR CONTROLLING THE INPUT/OUTPUT DEVICE

CROSS REFERENCE TO RELATED APPLICATION

The present application claims priority to Korean Patent Application No. 10-2021-0053708, filed Apr. 26, 2021, the entire contents of which is incorporated herein for all purposes by this reference.

BACKGROUND

Field of the Disclosure

The present disclosure relates to an input/output device and a method for controlling the same, and more particularly, to an input/output device and a method for controlling the same capable of reducing a package size of a controller including a connector and increasing the degree of freedom in designing the package of the controller by determining only necessary parts in a connector and selectively switching them to minimize the number of parts such as a housing and a terminal used in the connector.

Description of the Related Art

In general, connectors are widely used as electrical connection means for connecting electric wires in various electric devices for industry and vehicles, as well as household appliances such as washing machines and refrigerators. Among them, a vehicle connector is configured to include a housing, a terminal, and the like, and is divided into a male connector connected to an electric part and a female connector connected to an electric wire, which are fastened to make an electrical connection. In this case, the female connector and the male connector may include terminals.

In particular, a connector acts as a large factor in the weight of a controller package mounted on a vehicle. That is, a certain size of the controller is determined according to the size of the connector. However, if the size of the controller increases, the weight reduction and assemblability of the vehicle may be weakened, and the degree of freedom in designing the controller package may be reduced. However, in a high-voltage battery to which a large number of high-voltage electrical components are connected, such as an electric vehicle using an electric motor as a driving source or a fuel cell vehicle using a fuel cell or battery as a power source, there are problem in that the number of components according to the number of connectors is excessive and the price is high. Therefore, in the present technical field, there is a need for technological development in reducing the size of the connector.

The matters described as the related art are only for improving the understanding of the background of the present disclosure, and should not be accepted as acknowledging that they correspond to the prior art already known to those of ordinary skill in the art.

SUMMARY

The present disclosure has been proposed to solve the above problem, and an object of the present disclosure is to provide an input/output device and a method for controlling the same, capable of reducing a package size of a controller including a connector and increasing the degree of freedom in designing the package of the controller by determining only necessary parts in a connector and selectively switching them to minimize the number of parts such as a housing and a terminal used in the connector.

An input/output device according to the present disclosure includes a first input/output terminal that receives a forward signal from a limit switch or outputs power to a sensor; a second input/output terminal that receives a backward signal from the limit switch or receives a sensing signal from the sensor; and an integrated circuit that determines a communication target for exchanging a signal through the first input/output terminal and the second input/output terminal, and selectively receives or outputs the forward signal, the backward signal, the power of the sensor and the sensing signal based on the determination result.

The integrated circuit unit includes a first circuit that includes a limit switch forward signal input circuit and a sensor power generation circuit commonly connected to the first input/output terminal; a second circuit that includes a limit switch backward signal input circuit and a sensing signal input circuit commonly connected to the second input/output terminal; and a controller that activates the limit switch forward signal input circuit and the limit switch backward signal input circuit when the communication target is the limit switch, and activates the sensor power generation circuit and the sensing signal input circuit when the communication target is the sensor.

The controller may selectively activate the limit switch forward signal input circuit and the sensor power generation input circuit of the first circuit, and measures a voltage value according to a load of the first input/output terminal measured when activated to determine whether the communication target is the limit switch or the sensor.

The controller may remeasure the load of the first input/output terminal for a preset number of times when the voltage value according to the load of the first input/output terminal measured during activation is out of a preset range.

A method for controlling the input/output device according to the present disclosure includes the steps of determining, in the controller, the target for exchanging a signal through the first input/output terminal and the second input/output terminal; and selectively receiving or outputting the forward signal, the backward signal, the power of the sensor and the sensing signal, based on a determination result of the determining step.

In the determining step, the target may be determined by measuring a voltage value according to a load applied to the first input/output terminal.

In the determining step, the load of the first input/output terminal may be remeasured for a preset number of times when the voltage value according to the load applied to the first input/output terminal is out of a preset range.

According to a converter control device and a control method for the same, there is an effect of reducing a package size of a controller including a connector and increasing the degree of freedom in designing the package of the controller by determining only necessary parts in a connector and selectively switching them to minimize the number of parts such as a housing and a terminal used in the connector.

DETAILED DESCRIPTION

Specific structural or functional descriptions of the embodiments of the present disclosure disclosed in the present specification or application are presented by way of examples only for the purpose of describing the embodiments according to the present disclosure, and the embodiments according to the present disclosure may be implemented in various forms and should not be construed as being limited to the embodiments described in the present specification or application. Hereinafter, the embodiments of the present disclosure will be described in detail with reference to the accompanying drawings.

Figure 1:
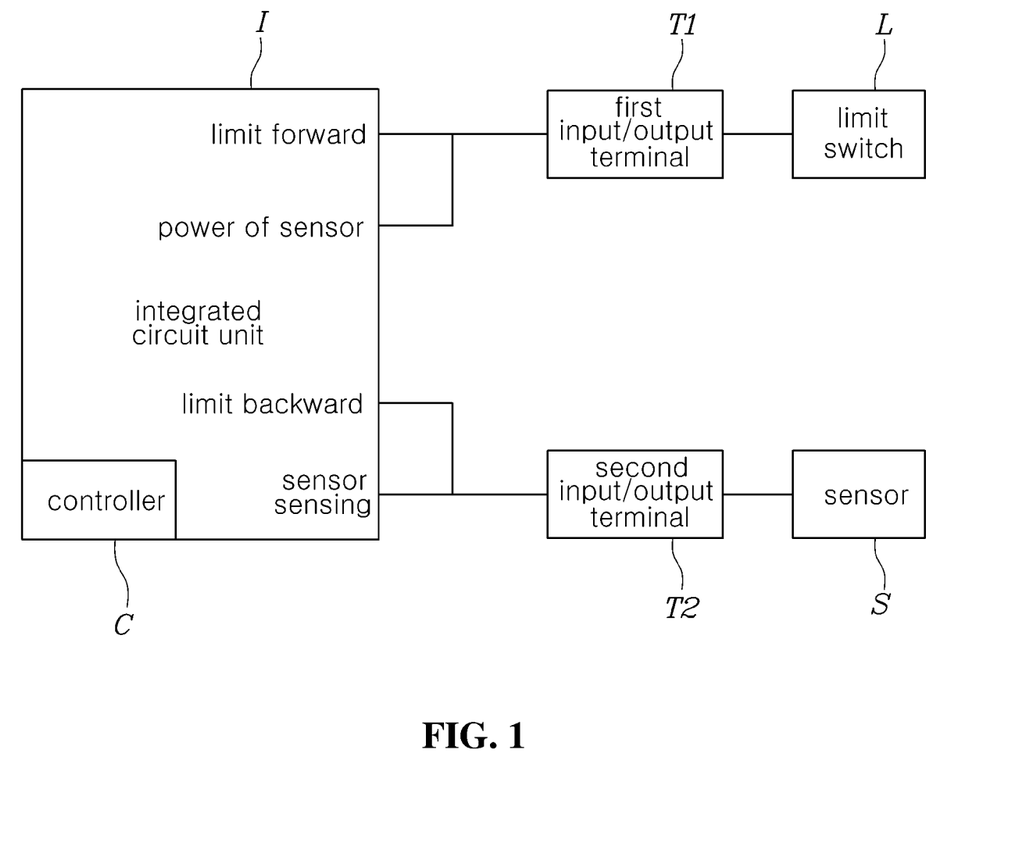
FIG. 1 is a block diagram illustrating an input/output device according to an embodiment of the present disclosure.
Figure 2:
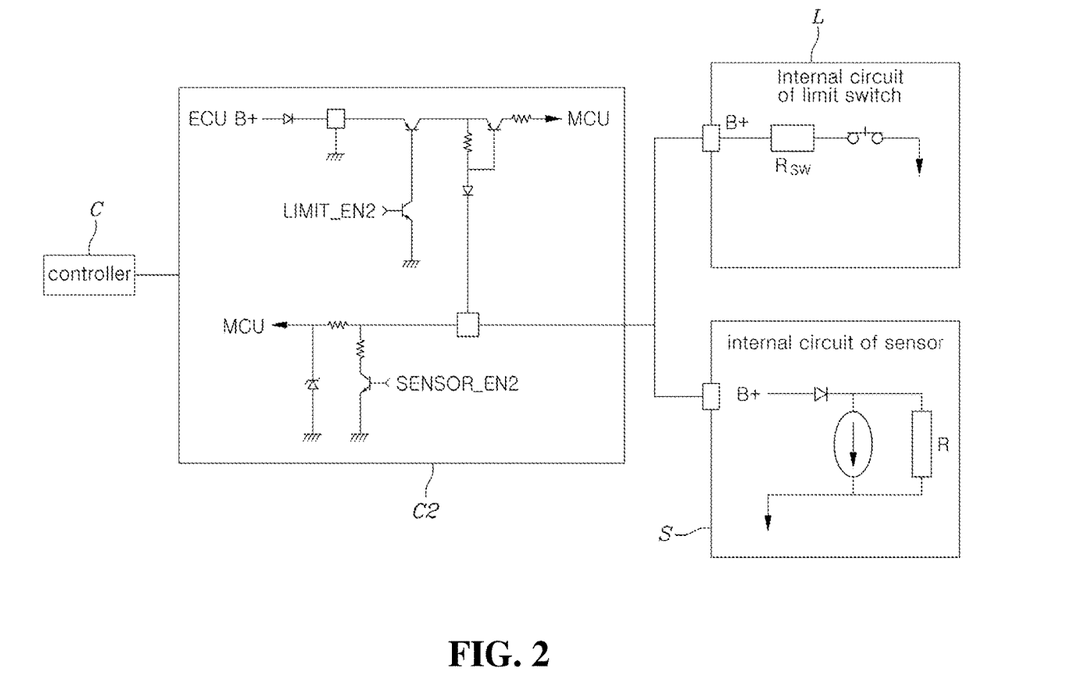
FIG. 2 is a diagram illustrating a mechanism of an input/output device according to an embodiment of the present disclosure.
Figure 3:
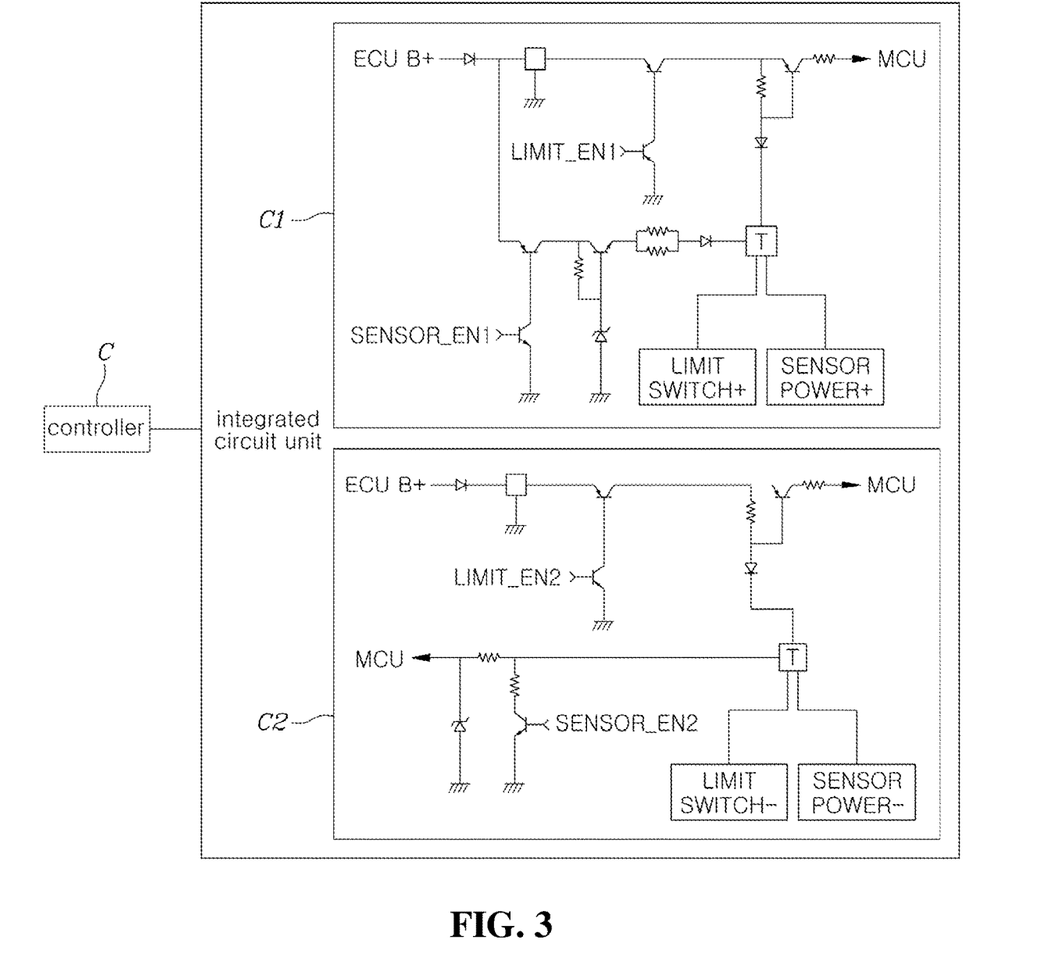
FIG. 3 is a block diagram illustrating an input/output device and a circuit of an integrated circuit unit according to an embodiment of the present disclosure.
Figure 4:
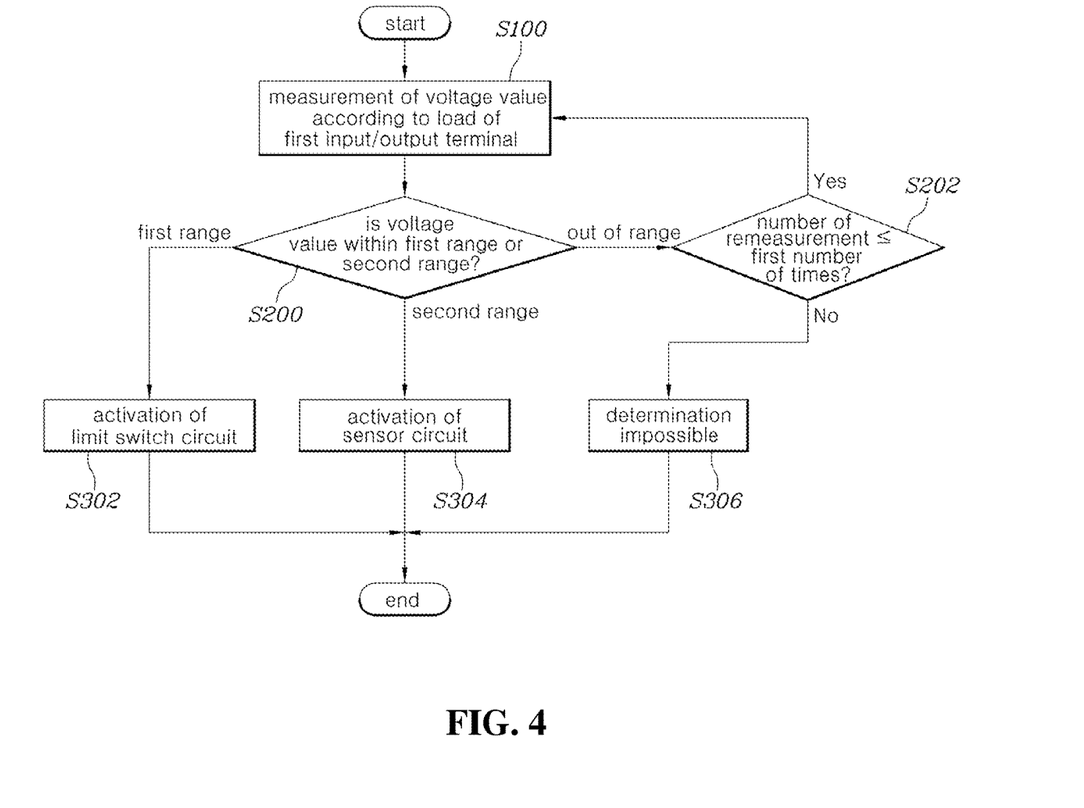
FIG. 4 is a flowchart illustrating a method for controlling an input/output device according to an embodiment of the present disclosure.

FIG. 1 is a block diagram illustrating an input/output device according to an embodiment of the present disclosure, FIG. 2 is a diagram illustrating a mechanism of an input/output device according to an embodiment of the present disclosure, FIG. 3 is a block diagram illustrating an input/output device and a circuit of an integrated circuit unit according to an embodiment of the present disclosure, FIG. 4 is a flowchart illustrating a method for controlling an input/output device according to an embodiment of the present disclosure.

In a control package system of an input/output device that connects a limit switch (L) and a sensor (S) together and controls it with a switching signal, each limit switch (L) and each sensor (S) of the conventional input/output device inputs/outputs a switching signal through a separate circuit and a separate input/output terminal. Here, a position limit switch, which is the limit switch (L), is installed on the seat of a vehicle and transmits a switching signal such as a forward signal or a backward signal through two first and second terminals upon contact to instruct the forward or backward movement of the seat. In addition, the conventional input/output device may be connected to a controller (C) for controlling a motor that drives the seat of the vehicle. The controller (C) includes a limit switch input unit that receives a forward signal or a backward signal through first and second terminals, a motor driving unit that drives the motor by driving a relay according to the signal of the input unit, a sensor driving unit that receives the power of a sensor through the first and second terminal, and a microcontroller that counts the sensing signal to calculate the moving distance of the seat. In the sensor (S), a third terminal for receiving the power of the sensor and a fourth terminal for outputting a pulse converted into an electrical signal are connected to a connector serving as the input/output device.

Therefore, in order to use the limit switch (L) and the sensor (S), a total of four pins are required: the first terminal for inputting and outputting the switch recognition for the limit forward signal, the second terminal for inputting and outputting the switch recognition for the limit backward signal, the third terminal for outputting the sensing signal of the sensor, and the fourth terminal for receiving the power of the sensor. In addition to this, when a memory position control function is added to a conventional electric seat, an encoder is required to generate two pulse waveforms with a phase difference of 90 degrees to detect the rotation speed and rotation direction of the motor for position control. Therefore, the conventional input/output device and the seat including the same are proportional to the number of each limit switch (L) and sensor (S), and each time the control device such as various memory controlling increases, it becomes larger. Therefore, in order to solve this problem of the conventional input/output device, the input/output device according to an embodiment of the present disclosure includes an integrated circuit unit (I) in which the circuits of each limit switch (L) and each sensor (S) are integrated.

FIG. 1 is a block diagram illustrating an input/output device according to an embodiment of the present disclosure. The input/output device according to an embodiment of the present disclosure includes a first input/output terminal (T1) that receives a forward signal from a limit switch (L) or outputs power to a sensor (S); a second input/output terminal (T2) that receives a backward signal from the limit switch (L) or receives a sensing signal from the sensor; and an integrated circuit unit (I) that determines a communication target for exchanging a signal through the first input/output terminal (T1) and the second input/output terminal (T2), and selectively receives or outputs the forward signal, the backward signal, the power of the sensor and the sensing signal based on the determination result.

The input/output device according to an embodiment of FIG. 1 connects each limit switch (L) and each sensor (S) based on the first input/output terminal (T1) and the second input/output terminal (T2), two in total. This control is possible by a new principle of determining whether the communication target for exchanging a signal is the sensor (S) or the limit switch (L) through the first input/output terminal (T1) and the second input/output terminal (T2). In an embodiment of FIG. 1, the integrated circuit unit (I) selectively receives or outputs the input/output signal of the limit switch (L) and the sensor (S) based on the above determination result. This integrated circuit unit (I) may selectively select or output the input/output signal through the controlling that activates or inactivates a switching element such as a transistor dedicated to each device based on the result of distinguishing and determining each device of the limit switch (L) and the sensor (S).

Such controlling may be performed through a controller (C), and the controller (C) may transmit the above signal to a motor to instruct a forward or backward slide. Alternatively, the controller (C) may instruct the motor by transmitting an electrical signal for operating a seat in a desired shape by contact to make a memorized or manually adjusted shape of the seat. As another example, the controller (C) may instruct a heating device such as a heating ray of the seat or a cooling device such as an air conditioner around the seat by transmitting an on/off signal through seating contact or sensing therefrom.

In contrast, the conventional input/output device basically connects each limit switch (L) and each sensor (S) based on a total of four terminals, and performs the on/off control through the controller (C). According to the size of the input/output device, the size of the controller package including the input/output device and the size of the seat to be installed are determined. Therefore, the input/output device according to the present embodiment may increase the design freedom of the controller package with the connection based on a total of two or more input/output terminals (T1, T2). Through this, the input/output device according to the present embodiment can maximize the use of the limited space of the vehicle in which the seat is installed and increase the convenience of the driver. In particular, the input/output device according to the present embodiment can provide a seat of an autonomous vehicle having various utilization spaces such as a boarding space, an indoor space, and a convenient space for the convenience of passengers, not drivers, through slimming and weight reduction of the seat.

Here, the limit switch (L) includes a device for converting a position signal of a power supply device with a switch by contact with a target to be recognized, such as a vehicle seat, an operation signal of a motor for movement such as up, down, left, and right, and an operation signal for on/off of various devices into an electrical signal. This contact includes physical contact by a mechanical device as well as a human, and includes physical contact phenomena such as opening and closing, unfolding and folding, as well as a simple pressing action by pressure.

Therefore, the limit switch (L) here includes a position limit switch that is installed at the positions of both ends where the seat of the vehicle is to be seated, and transmits an electrical signal for its position to the motor to instruct forward or backward (slide) by contacting during the movement of the seat. In addition, the limit switch (L) includes a shape limit switch that transmits to the motor an electrical signal that operates the seat in a desired shape by contact, and instructs tilt & height, recliner, etc. in order to make the shape of the seat to be memorized or manually adjusted, and a conditioner limit switch that transmits an on/off signal to a heating device such as a heating ray of the seat or a cooling device such as an air conditioner around the seat through seating contact or sensing therefrom.

In addition, the sensor (S) here includes a device that measures an external input signal, converts it into energy such as electrical energy that is easy to be measured, and transmits a signal-processed output signal through amplification, conversion, filtering, and the like. In particular, the sensor (S) here is installed on the seat of the vehicle, and includes a war sensor that detects the rotation direction, rotation speed, or number of rotations of the motor using the Hall effect and outputs the position of the seat among the tracks, and a hall sensor that outputs whether an arbitrary position is approached as a virtual limit switch. Finally, the sensor (S) here is installed on the seat of the vehicle, and includes a temperature sensor such as a negative temperature coefficient of resistance (NTC) temperature sensor, a positive temperature coefficient (PTC) temperature sensor, an integrated (IC) temperature sensor that detects the temperature of the seat, etc.

FIG. 3 is a block diagram illustrating the input/output device and the circuit of the integrated circuit unit according to an embodiment of the present disclosure. The integrated circuit unit (I) includes a first circuit (C1) that includes a limit switch forward signal input circuit and a sensor power generation circuit commonly connected to the first input/output terminal (T1); a second circuit (C2) that includes a limit switch backward signal input circuit and a sensing signal input circuit commonly connected to the second input/output terminal; and a controller (C) that activates the limit switch forward signal input circuit and the limit switch backward signal input circuit when the communication target is the limit switch, and activates the sensor power generation circuit and the sensing signal input circuit when the communication target is the sensor. That is, the present embodiment controls input/output by determining the communication target and activating each circuit connected in parallel.

As an example of FIG. 3, assume a case which is configured with a circuit controlling only the limit switch (L) for operation. When the controller (C) of the integrated circuit unit (I) determines that the communication target is the limit switch (L), as the determination result, it operates only the limit switch forward signal input circuit that receives the forward signal of the limit switch (L) of the first circuit (C1) connected to the first input/output terminal (T1) based on the determination result, and activates the switching element of the limit switch to selectively receive or output the forward signal. At the same time, the integrated circuit unit (I) inactivates the switching element connected to the power generation circuit that receives the power of the sensor (S) connected to the first input/output terminal (T1) of the first circuit (C1).

Similarly, when the controller (C) of the integrated circuit unit (I) determines that the communication target is the limit switch (L), it operates only the limit switch backward signal input circuit that receives the backward signal of the limit switch (L) of the second circuits (C2) connected to the second input/output terminal (T2), and activates the switching element of the limit switch to selectively receive or output the backward signal. At the same time, the integrated circuit unit (I) does not receive or output the sensor power and sensing signal of the sensor (S) by inactivating the switching element connected to the sensing signal input circuit that outputs the sensing signal of the sensor (S) of the second circuit (C2) connected to the second input/output terminal (T2).

As described above, the input/output device according to an embodiment of the present disclosure controls the input/output of signals in the form of switching the limit switch circuit and the sensor circuit respectively connected to the first circuit (C1) and the second circuit (C2) connected in parallel to either NO ((Normally Open)/NC (Normally Closed)) state or NC/NO state, based on the result of determining the communication target by the controller (C). Therefore, in this embodiment, the effect of weight reduction and slimming of the seat, which is an advantage obtained by minimizing the input/output terminals (T1 and T2), can be maximized by simplifying the circuits (C1 and C2) together. That is, according to the present embodiment, it is possible to increase the convenience of the driver and passengers by further expanding the space of the vehicle in which the seat is installed. In particular, the present embodiment includes the controller (C) for activating each circuit by determining the communication target. Accordingly, according to the present embodiment, the controller (C) determines the communication target by the electrical signal and performs the switching control at the same time to perform faster and more accurate input/output control.

FIG. 2 is a diagram illustrating a mechanism of an input/output device according to an embodiment of the present disclosure. The controller (C) selectively activates the limit switch forward signal input circuit and the power generation input circuit of the first circuit (C1), and can determine whether the communication target is the limit switch (L) or the sensor (S) by measuring the voltage value according to the load of the first input/output terminal (T1) measured during activation. That is, the input/output device of the present embodiment may determine the communication target based on the parameter measured by transmitting the power to the load connected to the first input/output terminal (T1).

The controller (C) of FIG. 2 is in a state in which it is not known whether the communication target is the limit switch forward signal input circuit or the sensor power generation input circuit of the first circuit (C1) (not illustrated in FIG. 2). Accordingly, only one of the two circuits is selectively activated. The input voltage according to the activation is distributed to the load connected to the first input/output terminal (T1) through an internal resistance. If the controller (C) is in a state in which the specific resistance (Rsw, R) of the internal circuit of the limit switch or the internal circuit of the sensor is known, it can determine whether the communication target is the limit switch forward signal input circuit or the sensor power generation input circuit by the difference between the ratio values of the output voltage according to the input voltage. At the same time, for the second circuit (C2) as illustrated in FIG. 2, the controller (C) may determine whether the communication target is the limit switch backward signal input circuit or the sensing signal input circuit in the same way as above.

A representative method of determining the communication target as illustrated in FIG. 2 is a determination method based on a difference in output according to an input. Among them, the determination method based on the difference in output voltage according to the input voltage at the time of activation as an electrical method, not a physical or chemical method, is the fastest method in the present embodiment in which electrical control is performed. Here, the activation may be a control for turning on/off the switching device of each circuit. Accordingly, in the present embodiment, the voltage according to the load measured at the time of activation is measured and determined. That is, in this embodiment, the communication target is determined using the principle of difference between the specific resistance values inside the limit switch and the sensor.

Such a measurement method may include a method of measuring the magnitude of the output voltage by applying a continuous DC voltage or an AC voltage, and the like. In this case, the voltage value may be calculated as in Equation 1 below.

$$V_{mcu} = V_{B+}\left(\frac{R}{R + R_{in}}\right) \qquad \text{[Equation 1]}$$

Here, $V_{mcu}$ is a voltage value according to the load of the first input/output terminal (T1) to be measured, $V_{B+}$ is a voltage value applied according to the selective activation of the first circuit, R is the resistance of the load, and $R_{in}$ is the internal resistance of the first circuit. That is, the controller (C) can determine the communication target by measuring the voltage value according to the voltage distribution on the premise that the specific resistances of the limit switch and the sensor, which are each load of R, are known.

It is apparent that the measurement method may determine the communication target by applying a discontinuous or single step voltage or pulse voltage and analyzing the magnitude and waveform of its output voltage. However, the input/output device according to the present embodiment can perform quick control through simple determination by measuring only the voltage value according to the load through the controller (C). Through this, the input/output device according to the present embodiment can minimize a processing delay while maximizing the use of two terminals compared to the conventional art in which four terminals are installed for each device.

FIG. 2 is a diagram illustrating the mechanism of the input/output device according to an embodiment of the present disclosure. When the voltage value according to the load of the first input/output terminal (T1) measured at the time of activation is out of a preset range, the controller (C) may remeasure the load of the first input/output terminal (T2) a preset number of times. That is, in the present embodiment, the accuracy of the determination is increased by increasing the number of determinations.

The method of determining the communication target of the input/output device of the present embodiment is a method of measuring an output voltage versus an input voltage. Here, it is effective in terms of energy efficiency or load to provide a low level continuous DC voltage through a voltage regulator as the input voltage. However, there cannot be a completely straight DC voltage in terms of the principle of the regulator or the conversion of AC to DC. Therefore, in the determination method of this embodiment, an error within a certain range may be included in the ratio value of the input voltage to the output voltage, which may be preset differently as the first range of the limit switch and the second range of the sensor. However, when this voltage value does not fall within the first range or the second range, determining the communication target as one of the devices may cause erroneous control. However, when such determination reaches a certain level of accuracy, it is undesirable not to limit the determination to less than the first number of times in view of speedy control. Accordingly, the input/output device according to an embodiment of the present disclosure can perform control accurately and quickly by performing appropriate remeasurement within a preset range and a preset number of times.

FIG. 4 is a flowchart illustrating a method for controlling an input/output device according to an embodiment of the present disclosure. The method for controlling an input/output device according to the present disclosure includes the steps of determining a target for exchanging a signal through the first input/output terminal (T1) and the second input/output terminal (T1) in the controller (C); and selectively receiving or outputting a forward signal, a backward signal, a power of a sensor and a sensing signal based on the determination result of the determining step (S302, S304, S306).

As the first step in FIG. 4, the control method of the present embodiment may include, as a determination step, the step of measuring a voltage value according to a load of the first input/output terminal (T1) (S100). At the same time, in this step, a voltage value according to a load of the second input/output terminal (T2) may be measured. As the next step, the control method of the present embodiment may include, as a determination step, the step of determining a target for exchanging a signal according to whether the voltage value is included in a first range or a second range (S200). If the voltage is out of both ranges, the control method of the present embodiment may return to the step of measuring the voltage value again (S100). In this case, the number of times of remeasurement may be limited to a preset first number of times (S202). After the number of times of remeasurement exceeds the first number of times, the method may include, as the determination step, the determination impossible step (S306) in which the determination is not made. In the step of determining an undetermined state (S306), the electronic control is not performed, and ON/OFF of a specified device may be controlled through other electronic control or physical/chemical control. When the target for exchanging a signal is determined, the control method of the present embodiment may include, as the last step which is the step of selectively receiving or outputting a signal, the step of activating or deactivating a circuit that performs on/off of each device accordingly (S302 and S304).

The step of selectively receiving or outputting a signal includes the step (S302, S304) of selectively activating the limit switch forward signal input circuit and the limit switch backward signal input circuit respectively connected to the first input/output terminal and the second input/output terminal (hereinafter referred to as a 'limit switch circuit'), or the sensor power generation circuit and the sensing signal input circuit respectively connected to the first input/output terminal and the second input/output terminal (hereinafter referred to as a 'sensor circuit'). In addition, in this case, it may include the determination impossible step (S306) in which it is not possible to determine which of the two circuits in the determination step. Similar to the above, in the determination impossible step (S306), the on/off of a specified device may be controlled through other electronic control or physical/chemical control without performing the electronic control according to the present control method.

The conventional method for controlling an input/output device basically controls on/off of each device connected to a total of four terminals. This control method allows the size of the target to be controlled to increase in proportion to the increase in the number of terminals. Therefore, in the method for controlling an input/output device according to the present embodiment, since the connection is made based on a total of two or more input/output terminals (T1 and T2), the space, such as a limited vehicle in which the target to be controlled is installed, can be utilized to the maximum. Through this, the control method of the present embodiment can increase the convenience of the user in which the target to be controlled is installed. In particular, the method for controlling an input/output device according to the present embodiment has an effect of providing various space for use, such as an indoor space and a convenient space, together with a space according to the original use of the target to be controlled, through slimming and weight reduction of the target to be controlled.

FIG. 4 is a flowchart illustrating a method for controlling an input/output device according to an embodiment of the present disclosure. In the determining step, a target may be determined by measuring a voltage value according to the load applied to the first input/output terminal (S100). The specific resistance of the limit switch and sensor, which is each load of R, can be found out first. Therefore, the control method of the present embodiment can determine the communication target by measuring the voltage value output according to the input voltage distribution. This control method enables rapid control through simple determination, compared to determining the communication target by analyzing the magnitude and waveform of the output voltage. Through this, the method for controlling an input/output device according to the present embodiment can minimize the processing delay while maximally utilizing the two terminals compared to the conventional art using four terminals installed for each device.

FIG. 4 is a flowchart illustrating a method for controlling an input/output device according to an embodiment of the present disclosure. In the determination step, when a voltage value according to the load applied to the first input/output terminal is out of a preset range, the load can be remeasured by a preset number of times (S200, S202). As illustrated in FIG. 4, in the method for controlling an input/output device according to the present embodiment, the communication target is determined by measuring the output voltage against the input voltage. Therefore, in the determination step of the present embodiment, an error within a certain range may be included in the ratio value of the input voltage to the output voltage, and therefore, if the voltage value is within the first range or the second range, it is reasonable to determine the communication target as one device. When such a determination reaches a certain accuracy, it is preferable to limit the number of times to less than the first number of times in terms of speed of control. Accordingly, in the method for controlling an input/output device according to an embodiment of the present disclosure, the remeasurement is appropriately performed within a preset range and a preset number of times, so that the control can be performed accurately and quickly.

The present disclosure relates to an input/output device and a method for controlling the same, and more particularly, to an input/output device and a method for controlling the same capable of reducing a package size of a controller including a connector and increasing the degree of freedom in designing the package of the controller by determining only necessary parts in a connector and selectively switching them to minimize the number of parts such as a housing and a terminal used in the connector.

The connector acts as a large factor in the weight of the controller package when it is mounted on a vehicle. That is, a certain size of the controller is determined according to the size of the connector. However, if the size of the controller increases, the weight reduction and assemblability of the vehicle may be weakened, and the degree of freedom in designing the controller package may be reduced. In particular, in a high-voltage battery to which a large number of high-voltage electrical components are connected, such as an electric vehicle using an electric motor as a driving source or a fuel cell vehicle using a fuel cell or battery as a power source, there are problem in that the number of components according to the number of connectors is excessive and the price is high.

In order to solve the problems of the conventional connector, the input/output device and the control method for the same according to the present embodiment reduces the weight of a target to be controlled, improves assemblability and increases price competitiveness and design freedom by performing the connection based on a total of two or more input/output terminals (T1, T2). In addition, the input/output device and the control method for the same according to the present embodiment can increase the space in which the target to be controlled is installed, thereby increasing user convenience.

Although illustrated and described with respect to specific embodiments of the present disclosure, it will be apparent to those of ordinary skill in the art that the present disclosure can be variously improved and changed without departing from the spirit of the present disclosure provided by the following claims.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An input/output device comprising:
    a first input/output terminal configured to receive a forward signal from a limit switch or output power to a sensor;
    a second input/output terminal configured to receive a backward signal from the limit switch or receive a sensing signal from the sensor; and
    an integrated circuit configured to determine a communication target for exchanging a signal through the first input/output terminal and the second input/output terminal, and selectively receive or output the forward signal, the backward signal, the power of the sensor and the sensing signal based on the determination of the communication target.

2. The input/output device according to claim 1, wherein the integrated circuit includes:
    a first circuit that includes a limit switch forward signal input circuit and a sensor power generation circuit commonly connected to the first input/output terminal;
    a second circuit that includes a limit switch backward signal input circuit and a sensing signal input circuit commonly connected to the second input/output terminal; and
    a controller configured to activate the limit switch forward signal input circuit and the limit switch backward signal input circuit when the communication target is the limit switch, and activate the sensor power generation circuit and the sensing signal input circuit when the communication target is the sensor.

3. The input/output device according to claim 2, wherein the controller is configured to selectively activate the limit switch forward signal input circuit and the sensor power generation input circuit of the first circuit, and measure a voltage value according to a load of the first input/output terminal measured when activated to determine whether the communication target is the limit switch or the sensor.

4. The input/output device according to claim 3, wherein the controller is configured to remeasure the load of the first input/output terminal for a preset number of times when the voltage value according to the load of the first input/output terminal measured during activation is out of a preset range.

5. A method for controlling the input/output device of claim 1, comprising the steps of:
    determining, by a controller, the communication target for exchanging the signal through the first input/output terminal and the second input/output terminal; and
    selectively receiving or outputting, by the controller, the forward signal, the backward signal, the power of the sensor and the sensing signal, based on a determination result of the determining step.

6. The method according to claim 5, wherein in the determining step, the communication target is determined by measuring a voltage value according to a load applied to the first input/output terminal.

7. The method according to claim 6, wherein in the determining step, the load of the first input/output terminal is remeasured for a preset number of times when the voltage value according to the load applied to the first input/output terminal is out of a preset range.

* * * * *